United States Patent [19]
Light et al.

[11] Patent Number: 5,831,631
[45] Date of Patent: Nov. 3, 1998

[54] METHOD AND APPARATUS FOR IMPROVED INFORMATION VISUALIZATION

[75] Inventors: John Light, Lake Oswego; John David Miller, Beaverton, both of Oreg.

[73] Assignee: Intel Corporation, Santa Clara, Calif.

[21] Appl. No.: 671,142

[22] Filed: Jun. 27, 1996

[51] Int. Cl.⁶ .................................................. G06F 15/00
[52] U.S. Cl. .......................................................... 345/440
[58] Field of Search .................................. 395/140, 141; 345/440, 441, 348, 349

[56] References Cited

U.S. PATENT DOCUMENTS 5,649,085   7/1997   Lehr .......................................... 345/440

OTHER PUBLICATIONS

Martie A. Hearst, "TileBars: Visualization of Term Distribution Information in Full Text Information Access," May 7–11, 1995, CHI'95 Mosaic of Creativity, pp. 59–66.

Richard Chimera, "Value Bars: An Information Visualization and Navigation Tool for Multi–attribute Listings," May 3–7, 1992, CHI'92, pp. 293–294.

Robert R. Korfhage, "To See, or Not to See—Is That the Query?," In Proceedings of the 14th Annual International ACM/SIGIR Conference, Chicago 1991, pp. 134–141.

Anselm Spoerri, "InfoCrystal: A Visual tool for information retrieval & management," In Proceedings of Information Knowledge & Management & '93, Washington, D.C., Nov. 1993, pp. 11–20.

Arents & Bogaerts, "Concept–Based Retrieval of Hypermedia Information: From Term Indexing to Semantic Hyperindexing," Information Processing & Management vol. 29, No. 3, 1993, pp. 373–386, printed in GB.

Gerald Salton and Michael J. McGill, *Introduction to Modern Information Retrieval*, McGraw–Hill Publishing Company, 1983.

*Primary Examiner*—Phu K. Nguyen
*Attorney, Agent, or Firm*—Blakely, Sokoloff, Taylor & Zafman

[57] ABSTRACT

An information handling system with a display device, and a software program for controlling the information handling system to process an information file to produce qualitative measurements of multiple attributes of the information file, and to generate an iconic graph with preselected dimensions for visually representing and displaying the qualitative measurements on the display device.

23 Claims, 6 Drawing Sheets

METHOD AND APPARATUS FOR IMPROVED INFORMATION VISUALIZATION

BACKGROUND OF THE INVENTION

1. Field of the Invention

The present invention relates to the field of information handling systems. More specifically, the present invention is related to a method and apparatus for providing a visual representation of multiple, quantifiable attributes of an information record on an information handling system display.

2. Background Information

The ability to convert information into digital format, and to store that information for later use has made the libraries of the world available to individuals for on-line searching and retrieval. It has also made it possible to send messages, in voice or text, that can be converted to digital text formats and stored in electronic mailboxes for an individual to retrieve and review. With the proper information handling system, such as a desk top computer, network computer, laptop computer, or wireless device hooked up to a network, such as the internet or world wide web, or a local area network, an individual can access and view any or all of this information.

Unfortunately, the vast quantity of information that an individual can retrieve with an electronic search, or receive in an electronic mailbox on an average day, can render the value of such search or electronic mail useless due to information overload. That is, with so much information, how do you determine which document or mail to read first, or which ones to delete without reading? Therefore, it has been desirable to come up with new methods and apparatus to present to the user a visual indication of the information that is of greatest interest to the recipient.

Typical solutions to the problem have included: (1) Using only the file name, as in a directory listing. This often fails to convey adequate information and often misleads the user concerning the contents of the document. (2) Using the document title. Many titles fail to adequately describe the contents of their documents, and often are so long that they must be truncated to fit, thereby cutting off information necessary to determine the contents of the document. (3) Using keywords. Adequate keywords to fully characterize a document takes a lot of space. Besides taking a lot of space, the first words of a document often fail to summarize a document's contents. (4) Using a textual summary of the document. Besides taking a lot of space, the writing of the summary is typically a manual process by a human being, and as such, could only be done for a small selection of information records.

Figure 1:
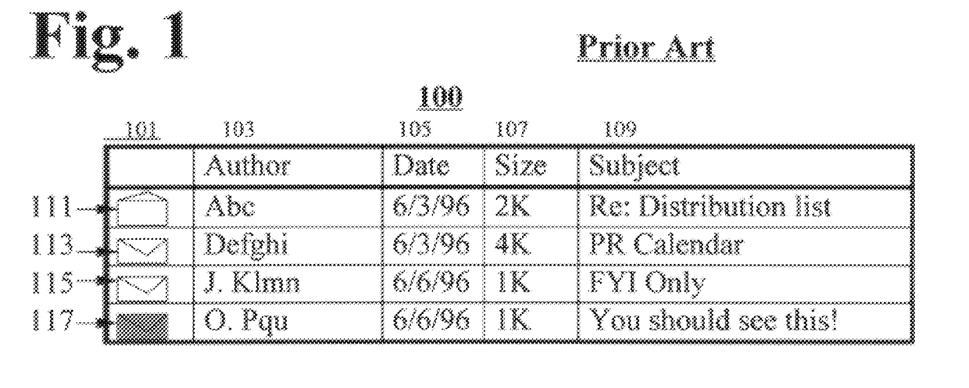
FIG. 1 shows a portion of a GUI display for an electronic mail system.

Information handling systems loaded with standard software application programs such as electronic mail (e-mail) and search engines and Graphical User Interfaces (GUIs) have made possible the collection and display of certain characteristics of information records. In the case of e-mail, it is known to display in text format such information as the author of the message, the date the information record or document was created, the size of the message, and a subject as provided by the author. It is also known that an icon, such as a representation of an envelope as shown in FIG. 1 can be associated with the text information to show if the message has been viewed, or the urgency that the author placed on the message. However, as will be explained in greater detail below, such icons as are known in the art do not provide for quantitative representations of multiple attributes associated with a document that would allow the recipient to visually determine if the message is worth reading sooner than another message as the title and urgency selected by the author does not always reflect the interest or the urgency that the recipient places on the same message. In addition, the representation of a document by its title and other textual identification has the disadvantage of taking large amounts of space in the visual field while failing to properly identify the contents of the document or information record in many cases. This problem is applicable to any collection of documents or information records, including the presentation of electronic document search results.

Figure 2:
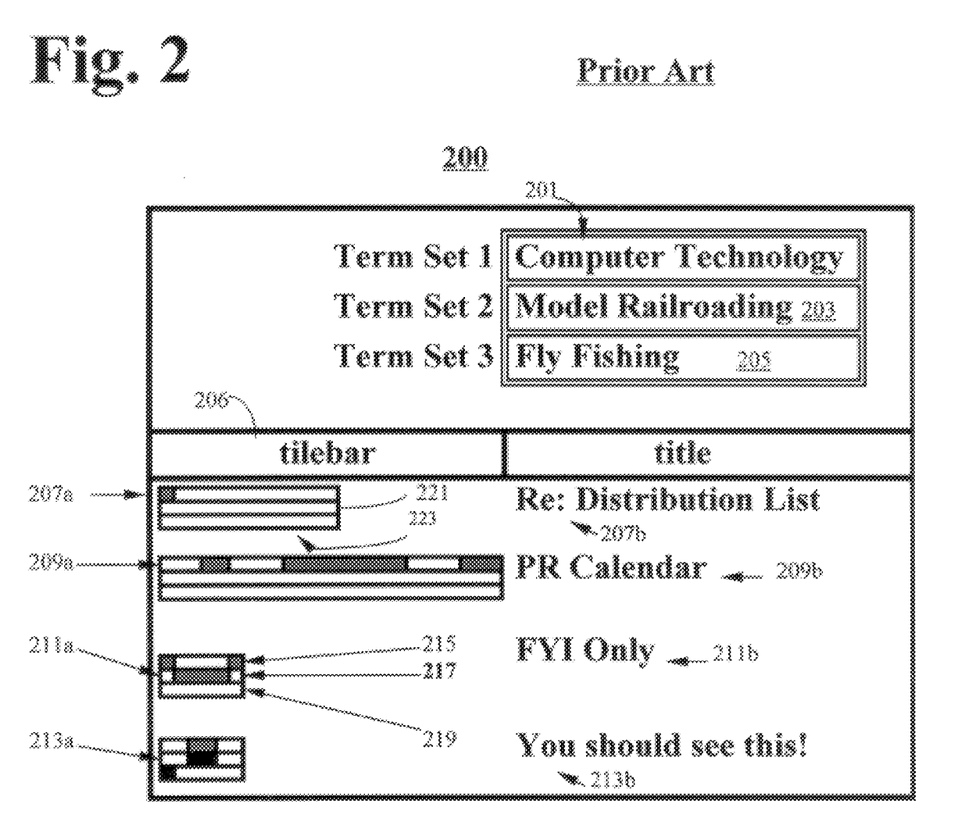
FIG. 2 shows a portion of a GUI display for a document search report.

In the case of data base searches, it is known to provide lists of documents that relate to certain topics that the requester defined for the search. One full text search system, as shown in FIG. 2, provides for the use of tilebars in which graphic information is presented along with the text information. A program on an information handling system generates a "tilebar" that aids visualization of the size of the documents by varying the length of the tilebar. It also visually displays the distribution of the search terms within the document. In such a system, the length and width of each tilebar varies depending on the number of search terms used, in that for each term searched, there is one corresponding layer of the tilebar, and the length of the tilebar varies with the length of the document. While such a system of visualization is an improvement over prior systems of displaying the output of a document search, such a search system still requires greater analysis on the part of the viewer, thereby requiring more time to determine how important a specific document is in relation to all the other documents. Also, the tilebar is a large graphic, taking up valuable display screen area. Nor does such a system provide for quantifiable measurement of multiple attributes of the document itself, rather, such systems display measurements of one document against all the other documents retrieved in a search.

Figure 8:
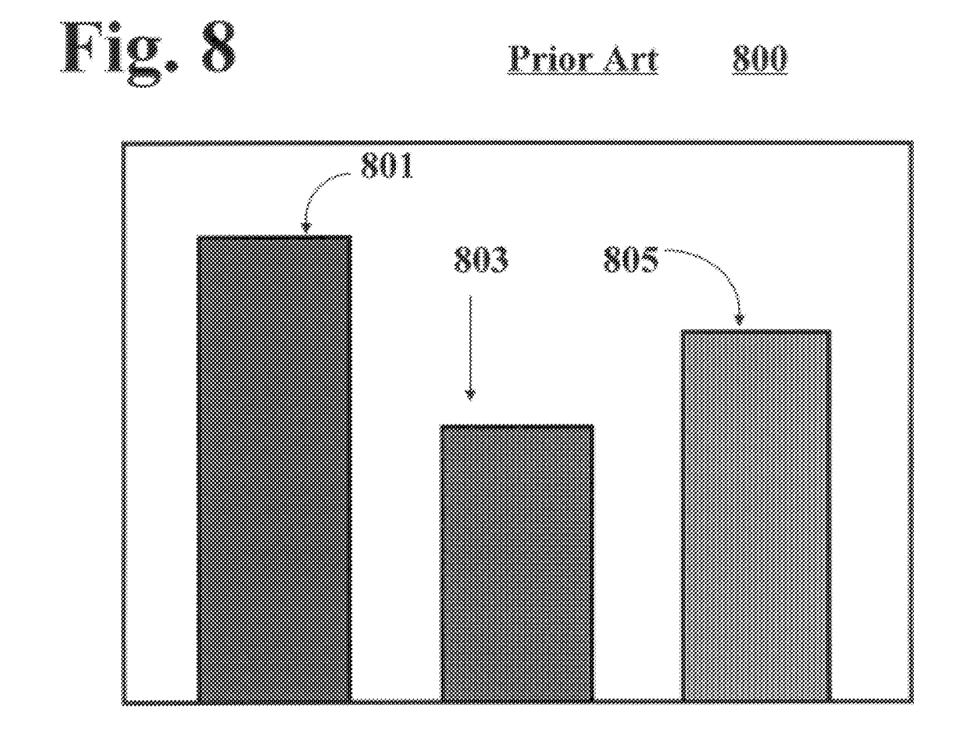
FIG. 8 shows a graph known in the art to show resource utilization of a host computer.

As shown in FIG. 8, it is known that an application program running under Microsoft Windows® 3.11 operating system could produce a three bar graph 800 to indicate the current level of resource usage (bars 801, 803, 805) of the host computer. When the application was running, the three bar graphs were annotated and labeled. When the application was minimized, the icon for the application consisted of the same three bars in the same three colors, but since the graph then resided in a 16×16 bit icon, no labels or annotation were visible. The result was a compact representation of the state of a computer system. However, this has never been applied to document visualization.

Thus, it is desirable to be able to provide an improved visual representation of multiple attributes of a document, as well as a system and method of providing a visual representation of multiple, quantifiable attributes of a document on an information handling system display.

SUMMARY

The purpose of the present invention is to provide a method and an apparatus for displaying multiple qualitative measurements of an information file comprising an information handling system with display means for displaying information, program means for processing an information file to produce qualitative measurements of multiple attributes of the information file, and means for generating an iconic graph of preselected dimensions wherein the iconic graph is a representation of the qualitative measurements of the multiple attributes of the information file.

The iconic graph provides a new, compact or small form factor visual representation that allows a person to quickly perceive certain qualitative attributes of an electronic document so as to visually sort and classify a large number of documents based upon the iconic graph associated with the documents. In addition, the present invention provides for a system and method for generating and displaying iconic graphs of various document metrics or attributes that can be used to supplement or replace other representations of documents currently in use. While described as being associated with the attributes of a document, this invention is not limited to any particular media type, such as text, rather, it can be used to represent the attributes of any information record. In addition, a single iconic graph could be used to represent multiple documents, or collections of documents or information records.

As is known in the art of Graphical User Interfaces (GUIs), such as that provided with the Windows® version 3.1 operating system from Microsoft Corporation, the size of an icon may be adjusted or scaled at any time by a user from a small size, of approximately 16 pixels by 16 pixels, where the label for the graph axes is hidden until brought out onto the display by a user moving a pointer onto the icon, to something larger in which the labels are visible on the axis at all times. While this scaling has been applied generally to bitmaps of icons, the same skills could be used to scale the iconic graph of the present invention, that may exist as a bitmap in some embodiments, or in some other form as the user elects to implement. The attributes of the document represented by the iconic graph can be selected by a user or by a default convention. As in standard GUI, the iconic graph can be placed where ever the user desires, or remain as placed on a display by a default setting. In accordance with this invention, the iconic graph can also be used to replace or be displayed in combination with other visual representations in existing applications.

BRIEF DESCRIPTION OF DRAWINGS

The present invention will be described by way of exemplary embodiments, but not limitations, illustrated in the accompanying drawings in which like references denote similar elements, and in which.

DESCRIPTION

In the following description, various aspects of the present invention will be described. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by an information handling system or computer system under software control consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the information handling system or computer system; and the term information handling system or computer system includes general purpose as well as special purpose data processing machines, systems, and the like, that are standalone, adjunct or embedded.

Various operations will be described as multiple discrete steps in turn in a manner that is most helpful in understanding the present invention. However, the order of description should not be construed as to imply that these operations are necessarily order dependent, in particular, the order of presentation.

The iconic graph of the present invention can be used to supplement other representations of a document, or groups of documents or information records, such as a title, to assist a user to understand the content of the document. For example, by seeing such an iconic graph beside the title of its associated document, the user may be able to make an informed decision about whether to open the document, or to pass up this document in favor of another document of greater interest.

As is well known, graphs are used to represent quantities. In addition to quantities, the present invention also graphs quantities of qualities. For clarification, "quantitative" generally means a numerical value, whereas a "quality" means a property of an item. As used herein, "qualitative" measurements of attributes means that an iconic graph can display the quantities (a numeric value) of N qualities (or properties), where N is any number. For some qualities, particularly abstract qualities such as, for example, "model railroading," it may be required to derive or compute the quantity of the quality.

The present invention provides a method and system for a user to specify the attributes of an information document, and an iconic graph to represent the quantitative measurements of those attributes for display on a GUI in an information handling system. In a one embodiment of the present invention, a user specifies a set of multiple attributes that are important to that user in making a determination to open up a document for viewing. The user preferably inputs the specific attributes desired, or selects from a menu of attributes supplied with the GUI program that is the front end for the user's particular application such as electronic mail, or a full text document search engine, such as that provided by Corporate® Intelligence for US Patents, or something on the internet such as that provided by Yahoo!™. The user may then also select the graph format of the icon to be displayed from a predefined selection that comes with the GUI, or use a default iconic graph provided by the GUI. Each information file or document that is subsequently received and processed by the application program, electronic mail or search engine, or any program that processes information, will have associated with it the user selected, or program selected iconic graph that will visually represent the multiple quantified attributes of that document or collection of documents.

Referring now to FIG. 1, there is shown an example of a GUI display 100 for an electronic mail application (e-mail) that processes electronic digital documents addressed to the recipient in a manner well known in the art. In such a known system, the documents are typically displayed in the order in which they are received and in this example consist of columns to display various fields of each information record such as icons 101, authors 103, the date the message was created or received 105, an indication of the size of the document 107, and a title or subject 109 provided by the author of the document. The icons (111, 113, 115, 117) in column 101 may themselves convey some information such as the message has been opened 111, or that the message is unopened (113, 115, 117). In addition, the icon may represent the urgency placed on the message by the author. Icon 117 represents that the message is urgent by its color or some other visible sign such as blinking.

FIG. 2 represents another GUI display 200 for a full text search application known in the art. Here the user can input some search selection criteria (201, 203, 205), and the GUI displays tilebars 206 consisting of bars of various sizes (207a, 209a, 211 a, 213a) in combination with their respective titles (207b, 209b, 211b, 213b). The tilebars 206 are comprised of layers (215, 217, 219) that represent the distribution of the search terms (201, 203, 205) within a specific document. The height 221 of the tilebar increases with each layer that is added to represent each search term, and the length 223 of the tilebar increases or decreases to represent the relative size of the document in comparison to the other documents that are retrieved.

Such known systems as shown in FIGS. 1 and 2 fail to provide compact visualization icons that display multiple quantified attributes of the document they represent.

Figure 3:
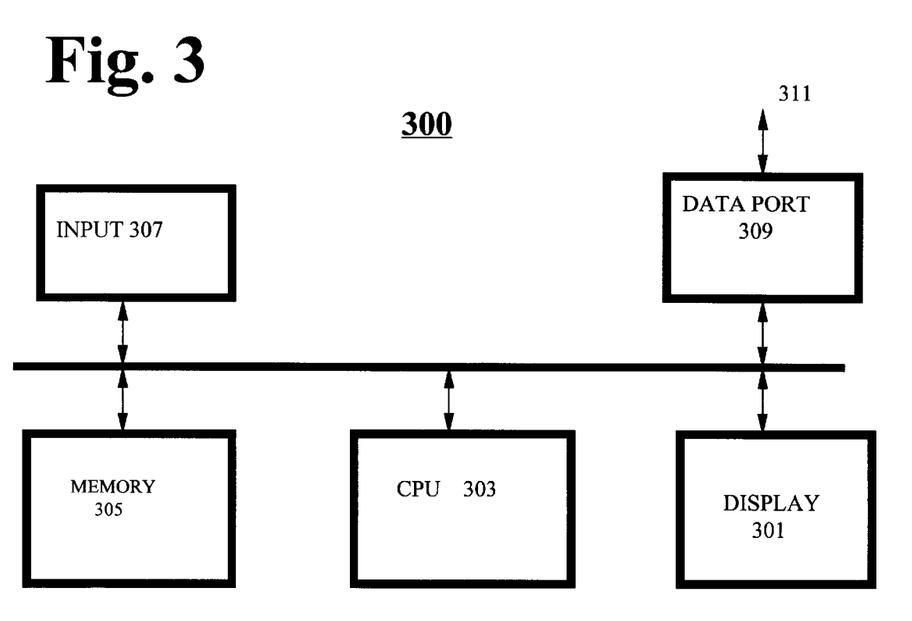
FIG. 3 shows a block diagram of an information handling system.

FIG. 3 is a block diagram illustrating an information handling system 300 of commercially available components that is suitable for practicing and displaying the GUIs of FIGS. 1 and 2, and can display an embodiment of the present invention described herein. It should be appreciated that the illustrated information handling system 300 is merely an example of a system and that other information handling system configurations may be used for practicing the present invention. Any device with a display 301, at least one central processing unit (CPU) 303 that communicates directly or indirectly with a memory 305, an input device 307, and a data port 309 to receive data, and the appropriate software to process the data and display it on display 301 is sufficient. Such a system 300 may be a desktop computer, a mobile computer, a handheld device, or a personal digital assistant (PDA). It may also be a network computer in which very little memory or no memory is included with or co-located with CPU 303, rather, the memory is accessed via data port 309 over a network connected to another information handling device (not shown) via communication channel 311 to provide the memory. In addition, data access port 309 could be a modem, an Ethernet card, or any connector or device for receiving data via communication channel 311, be it a cable, cellular, or satellite transmission channel. Input device 307 could be a mouse, a keyboard, a pen or touch screen. Display 301 could be a monitor or TV. An exemplary embodiment for the information handling device for practicing this invention is a Dell Dimension brand XPS P133c desktop computer with a 133 MHz Intel Pentium® processor, 16MB EDO RAM, a 1GB hard disk, keyboard, mouse, and an NEC MultiSync brand display. The Dell Dimension computer is equipped with a modem and an Ethernet card for access to both wide area networks (WAN) and local area networks, as well as to the internet. The following software programs are loaded on the computer to provide the identified functions: Windows® 3.1 operating systems software from Microsoft; cc:Mail version 2.2 software from Lotus for electronic mail, Lexis-Nexis Research Software version 4.0 from Lexis-Nexis for documents searches, and Netscape Navigator version 2.0 software from Netscape Communication Corporation for searching the internet.

Memory 305 stores an electronic mail program, or e-mail, such as cc:Mail by Lotus® that includes a GUI for displaying information regarding e-mail that has been received, in a format similar to that shown in FIG. 1.

Figure 4:
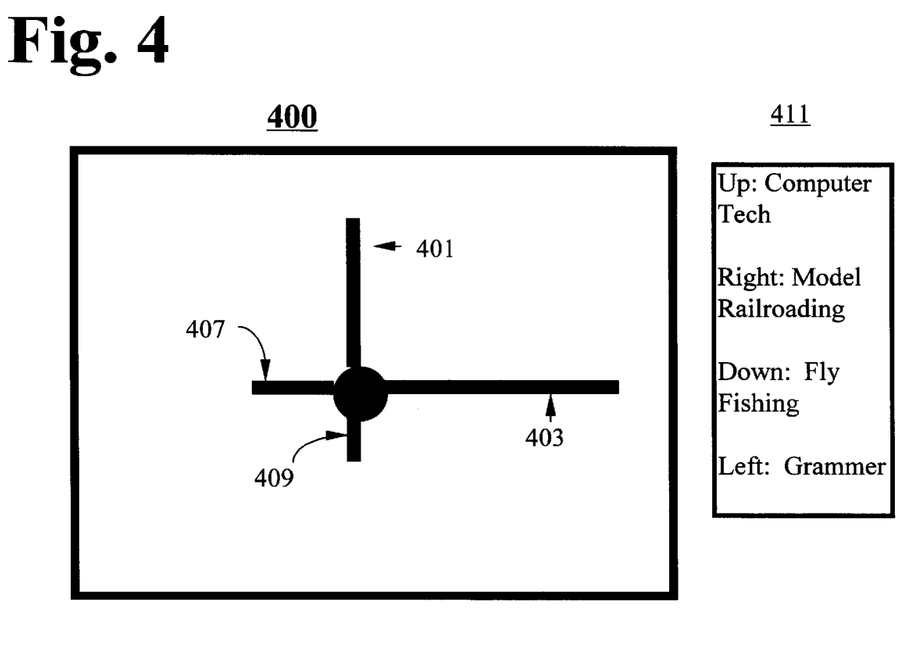
FIG. 4 shows an example of an embodiment of a version of the iconic graph.

Turning now to FIG. 4, there is shown an embodiment of the present invention, an iconic graph 400 that visually displays qualitative measurements or metrics of four selected attributes of a document. This particular format could be used to graph eight metrics, by adding the four diagonals. In this example, the four attributes or metrics are visually represented by an Up projection 401, a Right projection 403, a Left projection 407, and a Down projection 409. The length of each projection (401, 403, 407, 409) provides a visualization of the specific metrics associated with the specific projection. Depending upon the program used to implement this invention, the attributes to be quantified as well as the form of the graph to be displayed may be preselected, or they may be selectable by a user from a predefined menu of attributes or graph formats in a manner well known in the art, or they may be completely definable by a user input field such as term sets 1, 2, and 3 (201, 203, 205) as is shown FIG. 2 and in table 411. Such attributes of the document may be the size of the document, or the level of the grammar used in the document, or it may be very user specific such as "how strongly does this document relate to computer technology," "fly fishing," or "model railroading". Such qualitative measurements may be done via programs stored in memory 307. For example, if level of the grammar used in a document was a selected criteria, the program could access a standard grammar checker, such as Microsoft Word grammar checker found in Microsoft Word 6.0 which checks a document, and provides a quantitative measurement of the grammar used in the document, such as grade level or readability level. For the other metrics, various methods now existing, or as may be developed, assign qualitative evaluations of certain attributes to a document. The values for "model railroading," for example, can be generated by any number of means well known in Information Retrieval literature. An obvious way would be to use the result of a "Vector Similarity Function" (as described in Salton, McGill, *Introduction to Modern Information Retrieval.* McGraw-Hill Publishing Company, 1983, which is considered the primary reference for all Information Retrieval work, and is incorporated herein by reference) between the document and some other document known to discuss "model railroading". The evaluations, or qualitative metrics, by whatever means they are produced, are coded in a form such as a number which may be stored with the document or stored separately. The resulting qualitative attributes can be represented graphically in any form as shown by way of example in FIGS. 4 and 5. The present invention is not limited to graphs of the form of FIGS. 4 and 5, rather there is no limit as to what visual representation the graph portion of the iconic graph may take.

Figure 6:
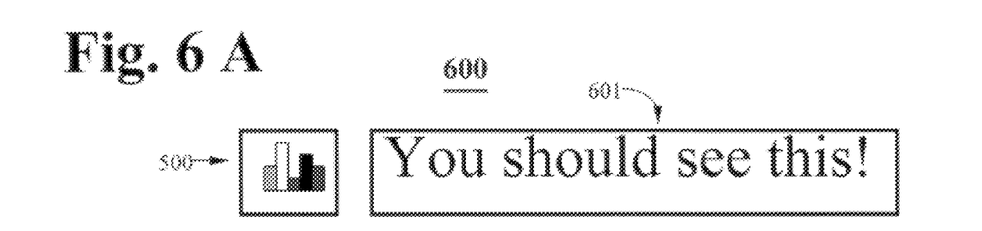
FIGS. 6A and 6B show examples of a version of the iconic incorporated into a portion of a GUI display for an electronic mail system.

In the one embodiment, when the iconic graphic representation is shown in conjunction with related text, such as a title as in FIGS. 6A and 6B, the graph will have a size on the order of the related text. When shown in situations without any related text, the choice of size for the iconic graph will usually be chosen large enough to effectively convey its contents while being small enough to allow a usefully large number of files to be represented. This sizing of the iconic graph (scaling up or down) can be accomplished in any manner as is well know in the GUI art. The present invention includes all uses of an iconic graph of numeric document attributes or metrics to represent or describe a single document.

Where the iconic graph is small (on the order of 16×16 pixels ("picture elements")), scale values, and enumeration's used to construct the graph can't be effectively displayed on the iconic graph itself. In some cases a single letter or number may identify an enumeration (not shown). However, in such a case the meanings of the axes, scale values, and enumeration's will be available to the user through some other mechanism as is typically done today, such as placing a pointer on the iconic graph, which causes the GUI to display the hidden text, as is shown in FIG. 6B, or to display a table 501 shown in FIG. 5. In an alternative embodiment, the information handling system may provide some other way of communicating this information such as by an audio message explaining the meaning of the axes, scale values and enumeration's alone, or in combination with the hidden text, either automatically or under control of the user. With repeated use, the user will preferably maintain an understanding of the axes, scale values, and enumeration's in his or her mind, or will adjust the size of the icon as is known in today's GUI to enable the text to be displayed with the axis of icon graph.

Figure 5:
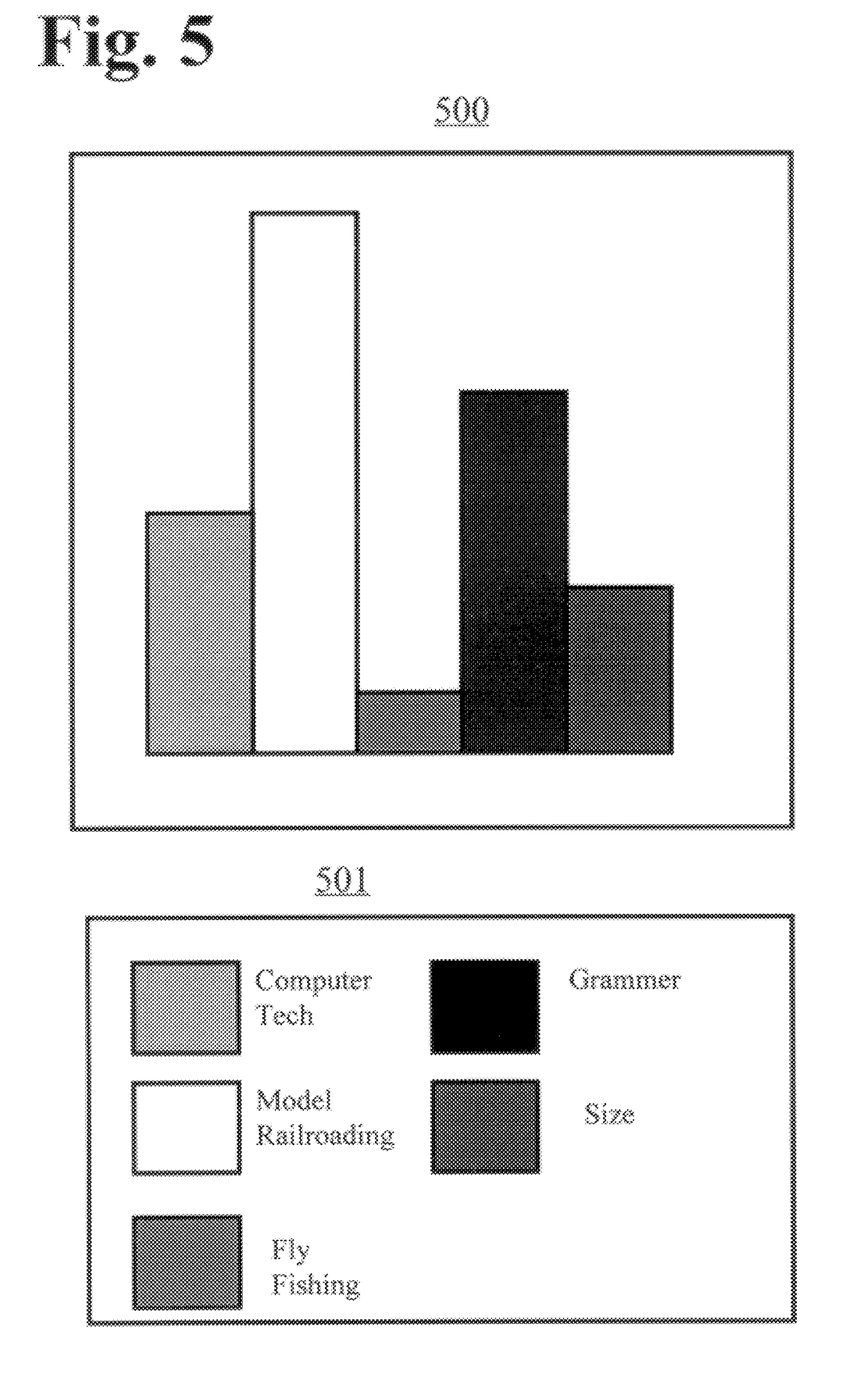
FIG. 5 shows an alternative embodiment of the iconic graph.

Turning now to FIG. 5, there is shown another exemplary embodiment of the present invention, an iconic graph 500 that visually represents five metrics defined in table 501. As explained above, table 501 would normally be hidden on the display until brought fourth by user command such as a certain key stroke or by placing the cursor over the iconic graph.

FIG. 6A represents an example of the iconic graph 500 of the present invention as it might appear in a listing of new e-mail message. The exuberance of the author made the title 601 useless. However, a glance at iconic graph 500 shows that the content of the message has multiple, qualitative attributes that are of interest to the recipient. In addition to table 501 to display the attributes, the use of a balloon 603 (FIG. 6B) as is known in the art can be used to identify the specific metrics.

Figure 7:
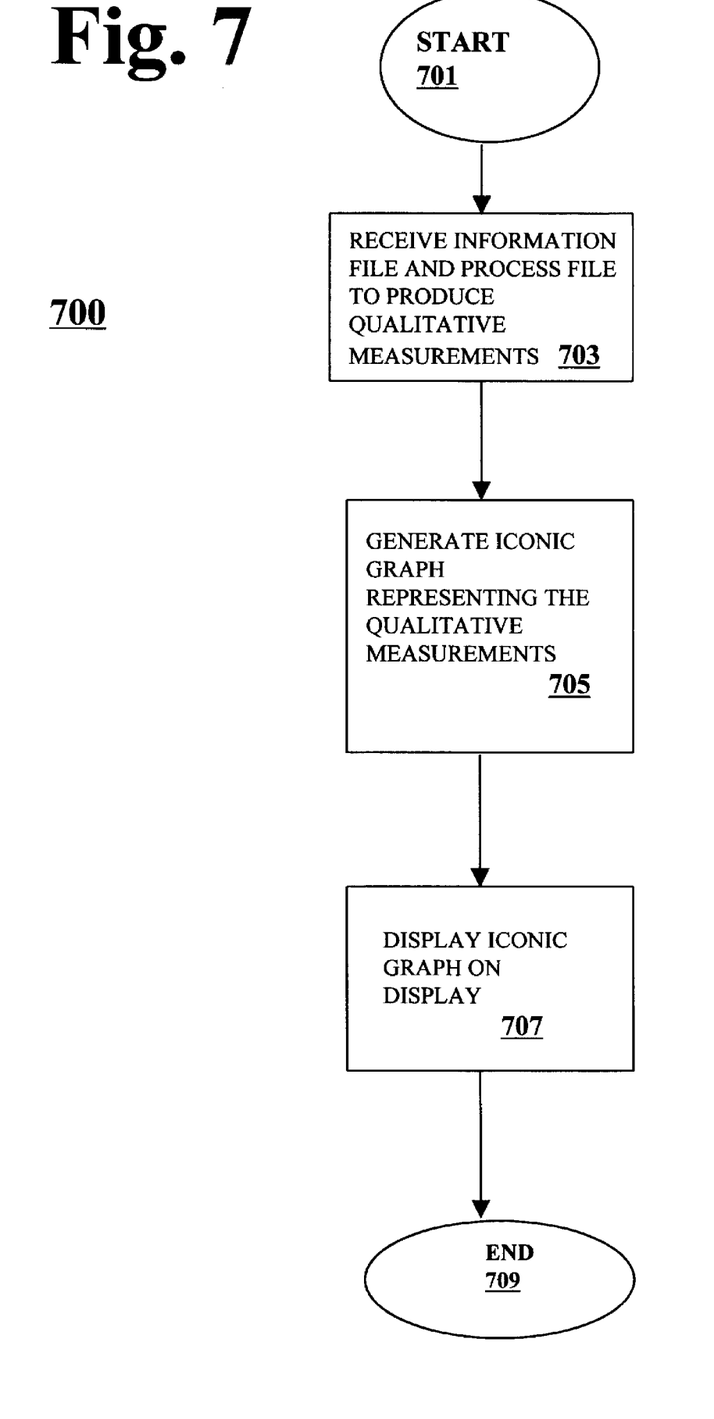
FIG. 7 shows an outline of a program to implement an embodiment of the iconic graph.

Turning now to FIG. 7, there is shown the outline of one program 700 to implement and display an iconic graph of the present invention. Upon starting the program 701, a user will generally be requested for input on the selection criteria and the form of the graph to be generated. In an alternative, the program may present a pull down menu of options to select, or these may be preset by default. The program then is then run in background (such as in an e-mail system) or is used directly (as in a document search) to receive information file(s), and to process the file(s) to produce the qualitative measurements 703. The program would then apply the qualitative measurements to the selected form of the graph to generate the iconic graph representing the qualitative measurements 705. The program would then display the iconic graph on a display 707. A skilled programmer could add to these steps to provide additional functions or features as he or she desires.

While the iconic graph of the present invention has been shown and described as representing the attributes of a single document or information file, it is is not to be so limited. The iconic graph can represent the attributes of multiple documents, or collection of documents such as one iconic graph to represent a summation of a search result, or the attributes of all the documents received by a user's e-mail system, or all the documents found at a particular web site on the internet or intranet.

These iconic graphs can be used in modern 2D computer display systems, such as Windows file and directory lists, temporarily or permanently replacing the file object's usual icon. While the graphical representation has been described as a 2D entity, the present invention is not so limited, and can be included in both 2D and 3D presentations. In 3D presentations the iconic graph will typically be applied to some flat surface in the 3D picture, but it may also be found floating in (virtual) space or applied to the surface of a non-flat object.

Characteristics of the graph, such as color and texturing, will be chosen to enhance the user's visualization and understanding of the graph contents.

Thus, a method and apparatus for improved visualization of multiple qualitative attributes of an information file has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus for displaying multiple qualitative measurements of a plurality of information files comprising:

an information handling system with display means for displaying information, program means that, when processed by the information handling system, is operative to analyze each information file to produce qualitative measurements of multiple attributes of the information file, and means for generating a standalone icon for each of the plurality of information files, employed by the information handling system as a pointer to each information file, wherein the icon is substantially comprised of an iconic graph of preselected dimensions and wherein the iconic graph is a representation of the qualitative measurements of the multiple attributes of the information file.

2. The apparatus of claim 1, wherein the multiple attributes are selectable by a user.

3. The apparatus of claim 1, wherein the attributes are identified on the iconic graph.

4. The apparatus of claim 1, wherein the attributes, are identified in a file associated with the visual representation.

5. The apparatus of claim 4, wherein the visual representation is displayed on a display of an information handling system, and the file of attributes is only displayed under control of a user.

6. The apparatus of claim 1 wherein each qualitative attribute includes a descriptor associated therewith.

7. The apparatus of claim 6 wherein each descriptor is displayed as part of the icon.

8. The apparatus of claim 1, wherein the attributes to be displayed are selectable by a user from a menu of attributes.

9. The apparatus of claim 1, wherein the iconic graph contains a graph representing the attributes of a single information record.

10. The apparatus of claim 9, wherein the format of the graph is selectable by a user.

11. The apparatus of claim 1 further including means) for communicating a description of each attribute of the iconic graph to a user.

12. An apparatus for displaying multiple qualitative measurements of a plurality of information files comprising:
- an information handling system with a display device operative to display information,
- a program that, when processed by the information handling system, is operative to control the information handling system to analyze each information file to produce qualitative measurements of multiple attributes of the information file, and to generate a standalone icon for each of the plurality of information files, employed by the information handling system as a pointer to each information file, wherein the icon is substantially comprised of an iconic graph of preselected dimensions wherein the iconic graph is a representation of the qualitative measurements of the multiple attributes of the information file.

13. The apparatus of claim 12, wherein the multiple attributes are selectable by a user.

14. The apparatus of claim 12 including a program for communicating a description of each attribute of the iconic graph to a user.

15. An apparatus for displaying multiple qualitative measurements of a plurality of information files comprising:
- a plurality of information files,
- an information handling system with a display device,
- a software program that, when executed by the information handling system, is operative to control the information handling system to analyze each information file and produce qualitative measurements of multiple attributes of the information file, and operative to generate a standalone icon for each of the plurality of information files, employed by the information handling system as a pointer to each information file, wherein the icon is substantially an iconic graph with scaleable dimensions for visually representing the qualitative measurements of the information file, and for causing the information handling system to display the iconic graph within the icon on the display device.

16. The apparatus of claim 15, wherein the information handling device includes input means for a user to input the multiple attributes of the information file to be measured.

17. The apparatus of claim 15 wherein the information handling system accesses the software program and or the information file over a network.

18. The apparatus of claim 15 wherein the information file is a single document.

19. The apparatus of claim 15 wherein the information file is more than one document.

20. The apparatus of claim 15 wherein the information file is a data base.

21. A method in a computer system for displaying a visual representation of multiple, quantifiable attributes of a plurality of information files, the computer system having a display device, wherein the method comprising the steps of:
- analyzing each information file to produce multiple qualitative measurements of attributes associated with the information file,
- generating a standalone icon for each of the plurality of information files, employed by the information handling system as a pointer to each information file, wherein the icon is substantially comprised of an iconic graph depicting the multiple qualitative measurements of the multiple attributes for each file, and
- displaying the iconic graph within the icon on the display device.

22. The method of claim 21, wherein the iconic graph is displayed in combination with additional attributes of the information file displayed in text format.

23. The method of claim 21 including the step of receiving the information record over a network.

* * * * *